3,082,255
ISOBUTYROPHENONE COMPOUNDS AND THE PRODUCTION THEREOF
Calvin L. Stevens, Detroit, and Robert W. Fleming, Ann Arbor, Mich., assignors to Parke, Davis & Company, Detroit, Mich., a corporation of Michigan
No Drawing. Filed Dec. 19, 1958, Ser. No. 781,444
6 Claims. (Cl. 260—570.5)

This invention relates to novel chemical compounds possessing central nervous system activity and to methods for their preparation.

It is an object of this invention to produce a new class of α-aminoisobutyrophenones and non-toxic acid-addition salts thereof having particular value as central nervous system stimulants. A further object is to produce the said compounds in a simple and expeditious manner. Additional objects will become apparent from a consideration of the following description and claims.

The α-aminoisobutyrophenone compounds of the invention in their free base form can be represented by the following formula

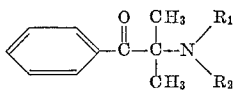

wherein $R_1$ represents a lower alkyl radical having at least two carbon atoms and $R_2$ represents hydrogen or a lower alkyl radical. Preferably $R_1$ and $R_2$ together contain fewer than seven carbon atoms.

The free bases of this invention and their non-toxic acid-addition salts exhibit a stimulant action on the central nervous system without causing a pressor effect on the cardiovascular system. They find utility in the symptomatic treatment of mild depressive states and fatigue. In addition, these compounds provide a safe and efficient means of combatting drug-induced central nervous system depression.

Several α-aminoisobutyrophenones which are homologs of the compounds of the invention are known. See, for example, Berichte 44, 57–69 (1911); Arch. Pharm. 271, 51–55 (1933), and J. Chem. Soc. 1932, 1932–1940. We have prepared these known substances and found them to be central nervous system stimulants. However, they suffer the disadvantage that they produce a marked pressor response on the cardiovascular system when administered at the same dose level as the compounds of the invention. This pressor response or raising of the blood pressure renders these prior art substances unsuitable for use as central nervous system stimulants in patients suffering from hypertension or cardiovascular diseases. In contrast thereto, the compounds of the invention unexpectedly produce central nervous system stimulation free of the pressor effect upon the cardiovascular system which is a characteristic disadvantage of the known α-aminoisobutyrophenones.

This invention also provides novel chemical compounds for use in those cases where it is desired to cause central nervous system stimulation accompanied by a depressor effect on the cardiovascular system. For this purpose, preferred embodiments of the invention are those free bases and non-toxic salts corresponding to the foregoing structural formula in which $R_1$ and $R_2$ in combination contain a total of at least three carbon atoms. Such preferred embodiments are characterized by a stimulant action on the central nervous system in combination with moderate hypotensive activity.

A further useful quality of the compounds of this invention is their ready absorption following oral administration. This is particularly useful in cases requiring treatment of long duration, eliminating the necessity of resorting to parenteral medication. The indicated oral dosage for adults is one or more tablets containing 5 mg. of the drug, depending on the degree of stimulation desired and the individual patient response.

In accordance with the invention, α-aminoisobutyrophenone compounds of the above formula and acid-addition salts thereof can be produced by reacting an α-haloisobutyrophenone with an alkali metal alcoholate to produce an epoxy ether compound of formula

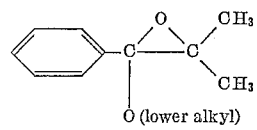

and reacting the epoxy ether compound with an alkylamine of formula, $HNR_1R_2$, where $R_1$ and $R_2$ have the same significance as given above and, if desired, treating the α-aminoisobutyrophenone compound with an acid.

The reaction of the α-haloisobutyrophenone with the alkali metal alcoholate is preferably carried out in an organic solvent. As solvents, the lower aliphatic alcohols corresponding to the alcohol used in the preparation of the alkali metal alcoholate are particularly suitable although other non-reactive organic solvents such as other lower aliphatic alcohols, ether, tetrahydrofuran, and the like can also be used. The reaction is preferably carried out by warming the reaction mixture although, particularly with non-alcoholic solvents, normal temperatures can be used if desired. For the sake of economy approximately equivalent quantities of the two reactants or a slight excess of the alkali metal alcoholate is used. The epoxy ether compound need not be purified before use in the next step of the process.

The reaction of the epoxy ether compound with the alkylamine, $HNR_1R_2$, is preferably carried out at an elevated temperature. When using the more volatile alkylamines the reaction should be carried out in a closed vessel to prevent loss of the amine. The proportion of the reactants is not critical, but it is preferable to use an excess of the alkylamine in order to ensure the most complete utilization of the epoxy ether compound. Diluents such as benzene or toluene can be employed, if desired, but they are not necessary and may be dispensed with.

The products of the invention can also be produced by reacting an α-aminoisobutyrophenone compound of formula

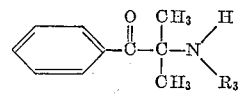

where $R_3$ represents hydrogen or a lower alkyl radical, with an alkylating agent. Among the alkylating agents which can be used are alkyl halides, alkyl benzenesulfonates, alkyl p-toluenesulfonates, dialkyl sulfates and the like. The alkylation reaction is preferably carried out in a solvent. The temperature of the reaction is not critical and in most cases high temperatures are unnecessary because the reaction proceeds at a satisfactory rate at normal temperatures. The ratios of the reactants can likewise be selected over a considerable range. Generally speaking, it is preferable to employ a slight excess of the alkylating agent to ensure that the more expensive α-aminoisobutyrophenone compound is utilized as completely as possible. In those cases in which $R_3$ in the foregoing formula represents an alkyl radical having two or more carbon atoms, a particularly suitable alkylating agent is a mixture of formaldehyde and formic acid which acts as a methylating agent.

Another method which can be used for the production of compounds of the invention consists in reacting an α-aminoisobutyronitrile of formula

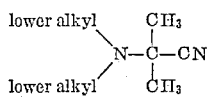

in which at least one of the alkyl groups (which can be the same or different) is an alkyl radical having two or more carbon atoms; with a phenyl derivative of an alkali metal such as phenyllithium or phenylsodium under anhydrous conditions and hydrolyzing the resulting reaction product. The first phase of the reaction is preferably carried out in anhydrous ether at reflux temperature. Tetrahydrofuran can also be used as a solvent. The relative proportion of the reactants is not critical and satisfactory results are obtained when they are used in approximately equivalent amounts.

In another method which can be used for the production of the compounds of the invention, a 1-phenyl-2-methyl-2-amino-1-propanol of the formula

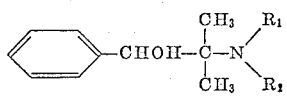

wherein $R_1$ and $R_2$ are defined as before, is treated with an oxidizing agent in order to convert the hydroxyl group to a ketone. Oxidizing agents suitable for this purpose include chromic acid and alkali metal dichromates such as sodium dichromate or potassium dichromate. The oxidation can be carried out in an aqueous solvent containing a mineral acid in which case the aminoalcohol employed as starting material is present in the form of an acid-addition salt. The oxidation reaction proceeds at a satisfactory rate at room temperature or lower and heating need not be employed. Completion of the reaction is facilitated by using a slight excess of the oxidant. The desired aminoketone is conveniently isolated by making the mixture basic and extracting with an organic solvent. The product can then be isolated as the free base by distillation of the organic extract, or as an acid-addition salt by treatment of the organic extract with an acid.

The 1-phenyl-2-methyl-2-amino-1-propanols employed as starting materials in the foregoing process can be obtained by the reaction of 1,2-epoxyisobutylbenzene of the formula

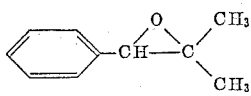

with an alkylamine of the formula $HNR_1R_2$ wherein $R_1$ and $R_2$ are defined as before. This reaction can be carried out by heating the reactants in an alkanol as a solvent preferably at about 100° C. or higher in a sealed reaction vessel.

In a further method for the production of the compounds of the invention, an isobutyramide corresponding to the formula

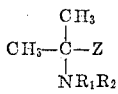

where Z represents a carboxamide group, is reacted with a phenylmagnesium halide under anhydrous conditions and the organometallic derivative formed in the reaction is subjected to hydrolysis. In the foregoing formula, Z can represent an unsubstituted carboxamide group or carbamoyl group ($CONH_2$), an N-substituted carboxamide group such as CONH-alkyl, or an N,N-disubstituted carboxamide group such as $CON(alkyl)_2$ or

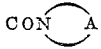

A in the latter formula representing the atoms required to complete a cyclic structure such as piperidino, pyrrolidino or morpholino.

The reaction of the amide with the phenylmagnesium halide is preferably carried out in an anhydrous medium such as ether or tetrahydrofuran at a temperature ranging from room temperature to the reflux temperature of the solvent. The desired product is isolated as the free base or as an acid-addition salt after hydrolysis of the organometallic derivative first formed.

The acid-addition salts of the α-aminoisobutyrophenone bases of the invention can be prepared by reacting the free base with a pharmaceutically-acceptable organic or inorganic acid. Some examples of the many pharmaceutically-acceptable organic and inorganic acids which can be used to produce the corresponding acid-addition salts are hydrochloric acid, hydrobromic acid, sulfuric acid, phosphoric acid, acetic acid, citric acid, tartaric acid, sulfamic acid and the like. The term "pharmaceutically-acceptable acid" designates an acid capable of being employed in the production of salts suitable for pharmaceutical use even though, like corrosive or strong mineral acids, it may not be acceptable for pharmaceutical use in and of itself. The expression "salts with pharmaceutically-acceptable acids" refers to chemical structure rather than to method of formation and includes such salts whether formed by neutralization or other salt forming means.

The invention is illustrated by the following examples:

*Example 1*

227 g. of α-bromoisobutyrophenone is added rapidly with stirring to a refluxing solution of 23 g. of sodium dissolved in 1 liter of dry methanol. After the addition has been completed, stirring is continued for about two minutes and then the reaction mixture poured onto ice. The mixture is extracted with benzene, the extract dried over sodium sulfate and the benzene distilled. The residue is distilled in vacuo to obtain the desired epoxy methyl ether compound boiling at 68–70° C. at 3 mm.; $n_D^{25}=1.4905$.

100 ml. of diethylamine is placed in a pressure vessel with 50 g. of the epoxy methyl ether prepared above and the mixture heated to 200° C. The mixture is shaken at 200° C. for twenty hours cooled and removed from the reaction vessel. A hydrochloric acid solution of the crude product obtained by evaporation of the solvent is washed with ether in order to remove neutral components. The ether washings are discarded; the aqueous phase is then made basic and extracted with several portions of ether. This combined ethereal extract is washed with water, dried and concentrated to a viscous residue. Distillation of this residue in vacuo yields the desired α-diethylaminoisobutyrophenone; B.P. 73–75° C. at 0.1 mm.; $n_D^{25}=1.5112$; $d_4^{25}=0.976$; λ max. 242 mμ in ethanol, $$E_{1\,cm.}^{1\%} = 515$$

The hydrobromide salt of α-diethylaminoisobutyrophenone is obtained by treating a solution of the free base in anhydrous ether with a slight excess of dry hydrogen bromide in isopropanol. The insoluble precipitate is collected and recrystallized from a mixture of isopropanol and ether to afford the purified hydrobromide, which is soluble in water, insoluble in ether and benzene.

The hydrochloride salt of α-diethylaminoisobutyrophenone is prepared by dissolving the free base in anhydrous ether and treating the solution with an excess of dry hydrogen chloride in isopropanol. The salt is collected and recrystallized from isopropanol-ether mixture; M.P. 151–152° C.;

$$E_{1\,cm.}^{1\%} = 364 \text{ at } \lambda \, 251 \, m\mu$$

*Example 2*

A reaction mixture prepared from 20 g. of the epoxy methyl ether prepared as in Example 1 and 50 ml. of di-n- propylamine is heated in a pressure vessel at 200° C. for 24 hours, with continuous shaking. The cooled mixture is then collected and most of the unreacted dipropylamine is removed by distillation under reduced pressure. The residue is dissolved in dilute hydrochloric acid, and neutral by-products are removed by washing this solution with ether. The aqueous phase is then made basic and extracted with several portions of ether. This combined ethereal extract is washed, dried and evaporated almost to dryness. The residue is subjected to fractional distillation. After removal of a forerun of additional unreacted dipropylamine at 20 mm., the desired α-dipropylamino-isobutyrophenone is collected as a fraction, B.P. 86–88° C. at 0.1 mm.; $n_D^{25}=1.5060$; λ max. 242.5 mμ in ethanol, $$E_{1\ cm.}^{1\%}=439$$

α-Dipropylaminoisobutyrophenone is converted to a water-soluble hydrochloride by treating an ethereal solution of the free base with a slight excess of hydrogen chloride in isopanol.

*Example 3*

A reaction mixture prepared from 50 g. of the epoxy methyl ether as prepared in Example 1 and 80 ml. of ethylmethylamine is heated in a high pressure reaction vessel mounted on a shaker for 20 hours at 200° C. The reaction vessel is then cooled and, after removal of unreacted ethylmethylamine and neutral by-products, the residue is fractionally distilled to obtain the desired α-ethylmethylaminoisobutyrophenone; B.P. 78–80° C. at 0.3 mm.; $n_D^{27.5}=1.5150$.

A water-soluble citrate of α-ethylmethylaminoisobutyrophenone is obtained by mixing methanolic solutions of the free base and citric acid and concentrating the mixture to a small volume.

The hydrochloride salt of α-ethylmethylaminoisobutyrophenone is prepared by dissolving the free base in ether and adding an excess of hydrogen chloride in isopropanol. The insoluble salt is collected and purified by recrystallization from isopropanol-ether mixture.

*Example 4*

A reaction mixture prepared from 50 g. of the epoxy methyl ether as obtained in Example 1 and 100 ml. of n-propylmethylamine is heated in a pressure vessel for 20 hours at 200° C. with continuous shaking. The cooled mixture is then collected and most of the unreacted propylmethylamine is removed by distillation under reduced pressure. The remaining product is dissolved in dilute hydrochloric acid. Neutral by-products are removed by washing this solution with ether. The aqueous phase is then made basic and extracted with several portions of ether. This combined ethereal extract is washed, dried and evaporated almost to dryness. By fractional distillation of the residue under reduced pressure, there is obtained first a forerun of additional unreacted propylmethylamine and then the desired α-propylmethylaminoisobutyrophenone; B.P. 86–87° C. at 0.3 mm. $n_D^{25}=1.5077$.

A water-soluble hydrochloride is obtained by treating an ethereal solution of α-propylmethylaminoisobutyrophenone with a slight excess of hydrogen chloride in isopropanol.

*Example 5*

α-Chloroisobutyrophenone (182.5 g.) is added rapidly with stirring to a refluxing solution of 23 g. of sodium dissolved in 1 liter of dry ethanol. After the addition has been completed, the mixture is stirred for two minutes and then poured onto ice. The mixture is extracted with benzene, the extract dried over sodium sulfate and the benzene distilled. Distillation of the residue in vacuo yields the desired epoxy ethyl ether; B.P. 73–74° C. at 1 mm.; $n_D^{25}=1.4840$.

By using isopropanol, secondary butyl alcohol and n-butyl alcohol in the above procedure, one obtains the corresponding epoxy isopropyl ether, B.P. 80–81° C. at 5 mm.; $n_D^{25}=1.4779$; epoxy secondary butyl ether, B.P. 91–92° C. at 5 mm., $n_D^{25}=1.4785$; and epoxy n-butyl ether, B.P. 92–93° C. at 3 mm., $n_D^{25}=1.4802$, respectively.

A mixture consisting of 59 g. of isopropylamine and 48 g. of the epoxy ethyl ether prepared above is placed in a closed reaction vessel and heated to 200° C. The mixture is shaken at 200° C. for twenty hours, cooled and the contents removed from the reaction vessel by solution of methanol. The solvent is removed by evaporation and the residue is warmed with dilute hydrochloride acid for 30 minutes. This serves to convert some imino compound which is present to the desired ketone. The hydrochloric acid solution is cooled and washed with a small quantity of ether which is discarded. The aqueous phase is then made basic with sodium hydroxide and extracted with several portions of ether. This combined ethereal extract is washed with water, made anhydrous and evaporated almost to dryness. The residue is distilled in vacuo to obtain the desired α-isopropylaminoisobutyrophenone; B.P. 97–98° C. at 1.2 mm.; M.P. 29.5–30.5° C. after crystallization from petroleum ether; $n_D^{27}=1.5108$ (supercooled liquid).

The hydrochloride salt of α-isopropylaminoisobutyrophenone is prepared by dissolving the free base in ether and adding an excess of isopropanolic hydrogen chloride to the solution. The product is collected and recrystallized from isopropanol-ether mixture; M.P. 229–230° C.

*Example 6*

A reaction mixture prepared from 50 g. of the epoxy methyl ether prepared as in Example 1 and 100 ml. of ethylamine is heated in a pressure vessel for 20 hours at 200° C. with continuous shaking. The cooled mixture is removed from the reaction vessel and most of the unreacted ethylamine is removed by evaporation. The residue is warmed with dilute hydrochloric acid for 30 minutes following which the solution is chilled and washed with a small quantity of ether in order to remove neutral by-products. The aqueous phase is made basic with sodium hydroxide and extracted with several portions of ether. The crude product recovered from the ethereal extract is fractionally distilled in vacuo to obtain the desired α-ethylaminoisobutyrophenone; B.P. 76–78° C. at 0.6 mm.; $n_D^{25}=1.5155$; λ max. 241.5 mμ in ethanol;

$$E_{1\ cm.}^{1\%}=428$$

A water-soluble hydrochloride is obtained by treating a solution of α-ethylaminoisobutyrophenone in anhydrous ether with a slight excess of dry hydrogen chloride in isopropanol.

*Example 7*

α-Ethylaminoisobutyrophenone (191 g., obtained as in Example 6) is added with cooling to 125 g. of 90% formic acid. To this mixture is added 95 ml. of 36% formaldehyde solution. Within about four hours, the evolution of carbon dioxide subsides and the mixture is then warmed at 90–100° C. for an additional two hours. Concentrated hydrochloric acid (100 ml.) is added and the entire mixture is evaporated to a thick syrup under reduced pressure. An aqueous solution of this product is made basic with sodium hydroxide and extracted with several portions of ether. The combined ethereal extract is washed with water, rendered anhydrous and concentrated to a small volume. By distillation of the residue in a vacuum, there is obtained α-ethylmethylaminoisobutyrophenone; B.P. 78–80° C. at 0.3 mm.; $n_D^{27.5}=1.5150$.

A water-soluble citrate of α-ethylmethylaminoisobutyrophenone is obtained by mixing methanolic solutions of the free base and citric acid and concentrating the mixture to a small volume.

A water-soluble hydrochloride of α-ethylmethylaminoisobutyrophenone is prepared by dissolving the free base

Example 8

With external cooling, 205 g. of α-propylaminoisobutyrophenone (prepared in the manner described in Example 1 from the epoxy methyl ether and n-propylamine) is added to 125 g. of 90% formic acid. To this mixture is added 95 ml. of 36% formaldehyde solution. The mixture is allowed to stand at room temperature until the evolution of carbon dioxide subsides and is then heated at 90–100° C. for 2 hours. It is then cooled, stirred with 100 ml. of concentrated hydrochloric acid and evaporated to a thick syrup under reduced pressure. An aqueous solution of the syrup is made basic with sodium hydroxide and extracted with several portions of ether. The combined ethereal extract is washed with water, rendered anhydrous, and evaporated to a small volume. Fractional distillation of the residue in a vacuum affords α-propylmethylaminoisobutyrophenone; B.P. 86–87° C. at 0.3 mm.; $n_D^{25}=1.5077$.

A water-soluble hydrochloride is obtained by treating an ethereal solution of α-propylmethylaminoisobutyrophenone with a slight excess of hydrogen chloride in isopropanol.

Example 9

A vigorously stirred mixture of 191 g. of α-ethylaminoisobutyrophenone in 500 ml. of water containing 60 g. of sodium hydroxide is treated gradually at about 25° C. with a total of 160 g. of diethyl sulfate. The basic reaction mixture is extracted with benzene. The benzene extract is made anhydrous and distilled to dryness. Efficient fractionation of the residue by vacuum distillation gives the desired α-diethylaminoisobutyrophenone; B.P. 73–75° C. at 0.1 mm.; $n_D^{25}=1.5112$.

The hydrobromide salt of α-diethylaminoisobutyrophenone is obtained by treating a solution of the free base in anhydrous ether with a slight excess of dry hydrogen bromide in isopropanol. The insoluble precipitate is collected and recrystallized from a mixture of isopropanol and ether to afford the purified hydrobromide which is soluble in water, insoluble in ether and benzene.

The hydrochloride salt of α-diethylaminoisobutyrophenone is prepared by dissolving the free base in ether and treating the solution with an excess of dry hydrogen chloride in isopropanol. The purified salt, M.P. 151–152° C., is obtained by collecting the crude product and recrystallizing it from isopropanol-ether mixture.

Example 10

Phenyllithium (84 g.) in 500 ml. of dry ether is added with stirring over a period of about one hour to a refluxing solution of 126 g. of α-ethylmethylaminoisobutyronitrile in 1 liter of dry ether. The reaction mixture is refluxed for an additional two hours, cooled and poured onto 1 kilogram of ice. The mixture is acidified with hydrochloric acid and the organic layer removed. The organic layer is discarded and the acid solution made basic with sodium hydroxide solution. The alkaline mixture is extracted with benzene, the extract dried and the benzene removed by distillation. The residue is distilled in vacuo to obtain the desired α-ethylmethylaminoisobutyrophenone; B.P. 78–80° C. at 0.3 mm.;

$$n_D^{27.5}=1.5150$$

A water-soluble citrate of α-ethylmethylaminoisobutyrophenone is obtained by mixing methanolic solutions of the free base and citric acid and concentrating the mixture to a small volume.

The hydrochloride salt of α-ethylmethylaminoisobutyrophenone is prepared by dissolving the free base in ether and adding an excess of hydrogen chloride in isopropanol. The insoluble salt is collected and purified by recrystallization from isopropanol-ether mixture.

Example 11

Phenyllithium (84 g.) in 500 ml. of dry ether is added slowly with stirring over a period of about one hour to a refluxing solution of 140 g. of α-diethylaminoisobutyronitrile in 1 liter of dry ether. The mixture is refluxed for two hours, cooled and poured onto 1 kilogram of ice. The mixture is acidified with hydrochloric acid and the organic layer separated. The organic layer is discarded and the aqueous solution made alkaline with sodium hydroxide solution. The alkaline mixture is extracted with benzene, the extract dried and the benzene removed by distillation. The residue is distilled in vacuo to obtain the desired α-diethylaminoisobutyrophenone; B.P. 73–75° C. at 0.1 mm.; $n_D^{25}=1.5112$.

The hydrochloride salt of α-diethylaminoisobutyrophenone is prepared by dissolving the free base in ether and treating the solution with an excess of isopropanolic hydrogen chloride. The salt is collected and recrystallized from isopropanol-ether mixture; M.P. 151–152° C.

Example 12

A solution of 14.8 g. of 1,2-epoxyisobutylbenzene, 10 ml. of isopropylamine and 20 ml. of isopropyl alcohol is heated in a sealed glass tube capable of withstanding high pressure for 8 hours at 175° C. The chilled mixture is removed from the tube and the solvent and excess isopropylamine are removed by evaporation. A solution of the residual oil in ether is extracted with dilute hydrochloric acid and the ethereal phase is discarded. The hydrochloric acid solution is made basic with sodium hydroxide and extracted with several portions of ether. The dried ethereal extract is evaporated and the residue recrystallized from petroleum ether to give 1-phenyl-2-methyl-2-isopropylamino-1-propanol, M.P. 94–95° C. A solution of 10.3 g. of this product in 30 ml. of water containing 3 ml. of concentrated sulfuric acid is treated slowly with a solution of 5 g. of hydrated sodium dichromate in 30 ml. of water containing 7 ml. of concentrated sulfuric acid. Stirring at room temperature is continued for 6 hours after which time the mixture is made basic and extracted successively with chloroform and with ether. The combined chloroform and ether extract is made anhydrous and treated with an excess of dry hydrogen chloride. The solvents are removed by distillation under reduced pressure and the residue is recrystallized from a mixture of isopropanol and ether to give the desired α-isopropylaminoisobutyrophenone hydrochloride, M.P. 229–230° C.

The free base is obtained by making an aqueous solution of the hydrochloride basic with sodium hydroxide and extracting with ether; B.P. 97–98° C. at 1.2 mm.; M.P. 29.5–30.5° C. after crystallization from petroleum ether; $n_D^{27}=1.5108$ (supercooled liquid).

Example 13

A solution of 74 g. of 1,2-epoxyisobutylbenzene, 50 ml. of ethylamine and 100 ml. of ethanol is heated in a pressure vessel for 8 hours at 100° C. The chilled solution is removed and evaporated to a viscous oil. This oil is dissolved in ether and the solution is extracted with dilute hydrochloric acid, after which the ethereal phase is discarded. The hydrochloric acid solution is made basic with sodium hydroxide and extracted with several portions of ether. The product obtained by evaporation of the dried ethereal extract and recrystallization of the residue from a mixture of benzene and petroleum ether is 1-phenyl-2-methyl-2-ethylamino-1-propanol; M.P. 120–121° C. To a solution of 15 g. of this product in 45 ml. of water and 4.5 ml. of concentrated sulfuric acid is added, over a period of 30 minutes, a solution of 7.5 g. of hydrated sodium dichromate in 45 ml. of water containing 10.5 ml. of concentrated sulfuric acid. Stirring is continued for 5 more hours after the addition has been completed. The mixture is then made basic with sodium hydroxide and extracted with chloroform and with ether. The chloroform-ether extract is evaporated almost to dryness and the residue is distilled in vacuo. The desired α-ethylaminoisobutyrophenone is obtained as a fraction boiling at about 76–78° C. at 0.6 mm.; $n_D^{25}$=1.5155; λ max. 241.5 mμ in ethanol, $$E_{1\,cm.}^{1\%} = 428$$

A water-soluble hydrochloride is obtained by treating a solution of α-ethylaminoisobutyrophenone in anhydrous ether with a slight excess of dry hydrogen chloride in isopropanol.

*Example 14*

A solution of 74 g. of 1,2-epoxyisobutylbenzene, 50 ml. of ethylmethylamine and 100 ml. of ethanol is heated in a sealed reaction vessel capable of withstanding high pressure for 10 hours at 150° C. The cooled mixture is removed and evaporated to a viscous oil. A solution of this oil in ether is extracted with dilute hydrochloric acid and the ether phase is discarded. The hydrochloric acid solution is then made basic with sodium hydroxide and extracted with ether. This ethereal extract is dried and evaporated to afford a residue which, when recrystallized from petroleum ether, yields 1-phenyl-2-methyl-2-ethylmethylamino-1-propanol, M.P. 48–50° C. To a solution of 15 g. of this compound in 45 ml. of water and 4.5 ml. of concentrated sulfuric acid is slowly added with continuous stirring a solution of 7.5 g. of hydrated sodium dichromate in 45 ml. of water containing 10.5 ml. of concentrated sulfuric acid. Stirring is continued for 5 more hours. The reaction mixture is then made basic and extracted with one portion of chloroform and with several portions of ether. The combined chloroform-ether extract is evaporated almost to dryness and the residual oil is fractionally distilled in a vacuum. The desired α-ethylmethylaminoisobutyrophenone is collected as a distillate boiling at about 78–80° C. at 0.3 mm.; $n_D^{27.5}$=1.5150.

A water-soluble citrate of α-ethylmethylaminoisobutyrophenone is obtained by mixing methanolic solutions of the free base and citric acid and concentrating the mixture to a small volume.

The hydrochloride salt of α-ethylmethylaminoisobutyrophenone is prepared by dissolving the free base in ether and adding an excess of hydrogen chloride in isopropanol. The insoluble salt is collected and purified by recrystallization from isopropanol-ether mixture.

*Example 15*

To a solution of phenylmagnesium bromide (prepared from 157 g. of bromobenzene and 24 g. of magnesium in 500 ml. of ether) is added with continuous stirring a solution of 93 g. of N,N-diethyl-α-ethylaminoisobutyramide in 500 ml. of anhydrous dioxane. The mixture is heated under partial reflux with continuous removal of the ether until the temperature reaches about 95° C. after which it is heated under total reflux for 20 more hours and then cooled. The reaction product is hydrolyzed with dilute hydrochloric acid and the mixture is washed with ether. The ether washings which contain neutral materials are discarded. The separated aqueous phase is made basic with sodium hydroxide and extracted with several portions of ether. The combined ethereal extract is washed with water, dried and evaporated. By fractional distillation of the residue in vacuo there is obtained α-ethylaminoisobutyrophenone as a distillate boiling at 76–78° C. at 0.6 mm.; $n_D^{25}$=1.5155; λ max. 241.5 mμ in ethanol, $$E_{1\,cm.}^{1\%} = 428$$

A water-soluble hydrochloride is obtained by treating a solution of α-ethylaminoisobutyrophenone in anhydrous ether with a slight excess of dry hydrogen chloride in isopropanol.

We claim:

1. A compound of the class consisting of α-aminoisobutyrophenone compounds and salts thereof with pharmaceutically-acceptable acids, said α-aminoisobutyrophenone compounds having the formula

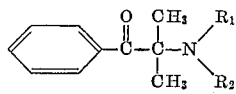

where $R_1$ is a lower alkyl radical having at least two carbon atoms, $R_2$ is a lower alkyl radical and said $R_1$ and $R_2$ contain a total of fewer than seven carbon atoms.

2. Salts of α-diethylaminoisobutyrophenone with pharmaceutically-acceptable acids.
3. α-Diethylaminoisobutyrophenone hydrochloride.
4. α-Diethylaminoisobutyrophenone.
5. α-Ethylmethylaminoisobutyrophenone hydrochloride.
6. α-Ethylmethylaminoisobutyrophenone.

References Cited in the file of this patent

UNITED STATES PATENTS

| | | |
|---|---|---|
| 1,767,423 | Adams | June 24, 1930 |
| 2,816,059 | Mills | Dec. 10, 1957 |

OTHER REFERENCES

Thomson et al.: J. Chem. Soc. (London), 1932, Part I, page 1937.

Hoover et al.: Jour. Org. Chemistry, vol. 12, page 506 (1947).

Burckhalter et al.: J. Amer. Chem. Soc., vol. 70 (1948) pp. 4184–6.

Ruddy et al.: J. Amer. Chem. Soc., vol. 72 (1950), pp. 718–21.

Perrine: J. Org. Chem., vol. 18 (1953), pp. 1356–67.

Wagner et al.: "Synthetic Organic Chemistry," pages 323, 332, 335, John Wiley and Sons, New York (1953).

Iwaoe et al.: Chemical Abstracts, vol. 49 (1955), column 8175e (abstract of J. Pharm. Soc. Japan, vol. 74 (1954), pp. 548–50).

Noller: Chemistry of Organic Compounds (2nd ed.), 1957, pp. 224; 232; 248; 478 and 745.